June 4, 1968    A. O. CORNING ET AL    3,386,503

DIFFERENTIAL HEATING PLATE

Filed Feb. 24, 1966

INVENTORS
ALLAN O. CORNING, &
LEWIS B. WOODLAND

BY *Mason, Porter, Diller & Brown*
ATTORNEYS

United States Patent Office 3,386,503
Patented June 4, 1968

3,386,503
DIFFERENTIAL HEATING PLATE
Allan O. Corning, Lombard, Ill., and Lewis B. Woodland, Boyertown, Pa., assignors to Continental Can Company, Inc., New York, N.Y., a corporation of New York
Filed Feb. 24, 1966, Ser. No. 529,746
10 Claims. (Cl. 165—185)

ABSTRACT OF THE DISCLOSURE

This invention is directed to a differential heating plate in which a base member is provided with a recess within which is removably secured a heat conducting insert having a generally annular recess in which is housed non-heat conducting material. A metallic heat conductive sheet is removably secured in overlying relationship to the insert whereupon heating of the base member the heat conductive sheet produces a progressive temperature differential or gradient thereacross. Means are provided for releasably securing the insert to the base member whereupon the insert can be removed and replaced by similar inserts differing in the amount of heat conductive to non-heat conductive surface areas present.

---

Many thermoplastic webs can be drawn into a mold by conventional vacuum drawing or similar thermoforming apparatus which generally includes some type of heating device for heating the thermoplastic material prior to the drawing or molding operation. As the depth of the mold into which the thermoplastic material is drawn increases, it has been found that the web is either too rigid to achieve the desired deep-drawn contour of the mold or, in attempting to adjust to the greater draw and increased surface area, the web will rupture.

In order to overcome these difficulties, it has been customary in the past to provide apparatus which preheats the thermoplastic webs to a temperature at which the plasticity thereof is increased and the web can be more readily drawn (or blown) into the mold and into contact with all surface portions thereof. Such preheating has been accomplished in many different ways as, for example, by the use of infrared lamps, blasts of hot air, or direct contact between a heated conductive member and the thermoplastic web. In the latter case, the heated member generally includes a stainless steel plate whose temperature is readily adjusted by resistance heaters embedded in or located upon the underside of the plate. Such heating plates are generally acceptable for forming articles of relatively shallow depth, but become increasingly inefficient as the mold depth increases.

As can be readily appreciated, when a portion of a thermoplastic web is uniformly heated to a temperature at which it is quite plastic and is then placed over a mold cavity which is connected to a vacuum source, there is a tendency for that portion of the web which immediately comes into contact with the periphery of the mold to drop in temperature and become more stiff. The portion of the web overlying the center of the mold is the first portion of the web to contact the mold bottom which causes a similar drop in temperature and a stiffness to the central portion of the web. This leaves an annular portion of the web between the edge of the mold and the center of the mold which is both momentarily unsupported and is at an elevated temperature as compared to the cooler portions just mentioned. Accordingly, the atmospheric force acting against the web causes the web to stretch mainly in this annular area as it accommodates itself to complete mold contact. Thus, a three-dimensional shape generated from a uniformly preheated flat web will show only slight reduction in gauge in the center of the bottom of the drawn article and along the edge of the drawn article. The annular area of the article that is both the last to cool appreciably and the last to be drawn into its final shape is of a much reduced gauge, particularly in the case of a rectangularly molded article, such as a container, at the four lower corners of which appreciable, undesirable thinning occurs.

As an example of the foregoing, under conventional apparatuses and methods, a three-mil web of thermoplastic material was drawn into a three-dimensional container having a depth of two inches. At the center of the bottom wall of the container and along the top lip of the container, the web was approximately three mils thick. However, much of the annular area referred to above was reduced to a total gauge of 1.5 mils and, in extreme cases, the four corners heretofore noted are reduced to under 0.5 mil. Such a container is, of course, completely unsatisfactory since the thin weak points will rapidly fracture as a result of impact or abrasion.

The above and other disadvantages in conventional heating plates have been overcome in accordance with this invention by first providing a heating plate of conductive metallic material provided with annular impressions into which was inserted relatively non-heat conductive material, such as asbestos. Thus, those portions of a thermoplastic web which would ultimately become the center of the bottom of a formed article and the upper flanges would elevated in temperature by the conductive material of the heating plate while an intervening annular area, corresponding to, for example, the body wall of a container between its bottom wall and upper flange, would be heated somewhat less. A heating plate of this construction achieved some success but did not completely solve the problems heretofore noted since the temperature gradient between those portions of the web in contact with the metal and those portions in contact with the asbestos was too abrupt. One defect that resulted in some cases was the generation of parallel gauge bands or stripes (die marks) in the completely drawn article which are objectionable, particularly in the packaging or container manfacturing industry.

It was unobviously found that the above-noted die marks could be eliminated by covering the entire surface area of the heating plate which contacts the thermoplastic web with highly conductive metallic material, such as brass shim stock, which affected a gradual or progressive temperature gradient between the hottest and the coolest surface areas of the heating plate. In practice, it has been found that a three-mil web such as that described earlier, when heated by the plate immediately above described and drawn to a three-dimensional shape, resulted in excellent wall thickness with no area area being reduced to less than 2.0 mils.

It is, therefore, a primary object of this invention to provide a novel heating plate of the type heretofore described which includes both heat conductive and non-heat conductive surface areas, and means for producing a progressive temperature gradient across the heat and non-heat conductive areas whereby articles of maximum depth can be drawn with a minimum variation in wall thickness of the drawn articles.

A further object of this invention is to provide a novel heating plate of the type immediately above described in which the non-heat conductive areas are formed by housing non-heat conductive material in generally annular channels of a conductive insert, and the insert is removably secured to a base member whereby the insert can be removed and replaced by similar inserts differing in the amount of heat conductive to non-heat conductive material present for effectively heating a thermoplastic web in dependence upon the particular size and shape of mold being employed at a given time.

With the above and other objects in view that will hereinafter appear, the nature of the invention will be more clearly understood by reference to the following detailed description, the appended claimed subject matter, and the several views illustrated in the accompanying drawing.

Figure 1:
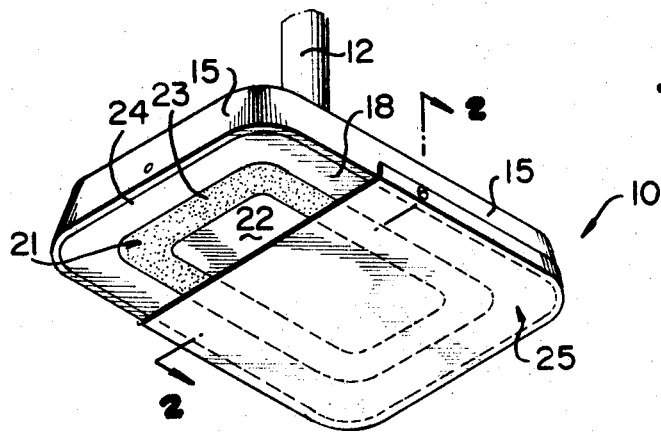
FIGURE 1 is a partial fragmentary bottom perspective view of a novel heating plate constructed in accordance with this invention, and illustrates a conductive insert, an annular area of non-heat conductive material in the insert, and a highly conductive metallic shield covering the insert and both the heat and non-heat conductive portions thereof.
Figure 2:
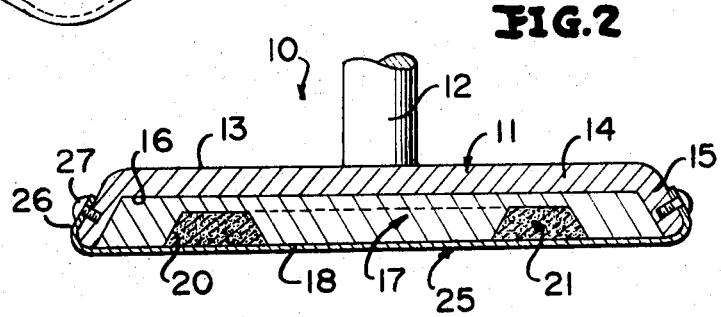
FIGURE 2 is an enlarged sectional view taken generally along line 2—2 of FIGURE 1, and more clearly illustrates the non-conductive material housed in a recess of the conductive insert.

A novel differential heating plate constructed in accordance with this invention is fully illustrated in FIGURES 1 and 2 of the drawing, and is generally designated by the reference numeral 10. The heating plate 10 includes a base member 11 to which is secured a support or rod 12. Depending upon the particular thermoforming operation to be performed upon a web of thermoplastic material and the particular apparatus of which the heating plate 10 forms a part, the rod 12 is moved by means (not shown) to move the heating plate 10 from a position below a thermoplastic web (not shown) to a position in contact with the thermoplastic web or, alternatively, from a position above an upper surface of the web to a lower position in contact with the web. In either case the function of the hating plate 10 is to heat the web prior to a subsequent step at which the web is drawn to a particular configuration, as will be more clearly apparent hereafter.

The base member 11 is preferably constructed from heat conductive material and resistance heaters (not shown) are preferably secured in a conventional manner to an upper surface 13 of the member 11 to uniformly heat the latter. The base member 11 is defined by a wall 14 and a peripheral skirt 15 which in turn define a generally rectangular recess or chamber 16.

A heat-conductive metallic insert 17 is housed within the recess 16. The insert 17 is preferably constructed from stainless steel or other similar heat-conductive material. A lower surface or face 18 of the insert 17 is provided with an annular indentation or recess 20 (FIGURE 1) which is generally of a trapezoidal configuration in transverse cross-section (FIGURE 2). Non-heat conducting material 21, such as asbestos, is located in the recess 20 and secured therein by conventional means (not shown). Due to the non-conducting material 21, a generally rectangular central heat-conducting portion 22 of the insert 17 is surrounded by a non-heat-conducting portion 23 defined by the material 21 while an outermost portion 24 of the plate 10 is both annular and heat-conductive (FIGURE 1). The surface portions are areas 22, 23 and 24 thereby effect a temperature gradient across the surface 18 of the insert 17 which is respectively conductive, non-conductive and conductive.

The heating plate 10 is of a generally rectangular configuration and is designed to cooperate with a mold or cavity in which is drawn a generally rectangular container. The cavity (not shown) includes a bottom-forming wall, a body-forming wall and a flange-forming wall to respectively form a container bottom wall, body wall and flange (all not shown). As was heretofore noted, the portions of the web material which eventually form the container flange and bottom wall contact the mold first, are cooled thereby and tend not to deform appreciably while the portion of the web which is to form the body wall tends to contact the mold last and stretch most. However, due to the differential heating effected by the heating plate 10, portions of a thermoplastic web contacted by the portions 22, 24 are heated appreciably more than an annular portion of the web contacted by the portion 23. During the drawing operation of the thus differentially heated web, the portions of the web heated by the portions 22, 24 of the plate 10 first contact the mold and cool to a temperature corresponding to the annular portion of the web heated by the portion 23 of the plate. At this point the web is substantially of a uniform temperature and generally uniform drawing will result as atmosphere acts against the surface of the web opposite that under the influence of a vacuum. In this manner, substantially uniform wall thickness of the finally formed article can be achieved.

As was heretofore noted, one defect which resulted at times in the use of an insert corresponding to the insert 17 was the generation of parallel gauge bands or stripes in the drawn article. This was due to the rather abrupt temperature gradient between the portions 22, 23 and 24 of the heating plate 10 and the corresponding heated portions of the thermoplastic web.

In accordance with this invention, this abrupt undesirable temperature gradient is overcome by means of a shield or cover, generally designated by the reference numeral 25, which completely overlies and covers the entire surface 18 of the insert 17. The shield 25 is preferably constructed from highly heat-conductive material, such as brass, and includes a peripheral skirt 26 secured by conventional fasteners 27 to the peripheral skirt 15 of the base member 11. The shield or cover 25 is only partially illustrated in FIGURE 1 of the drawing, but it is to be understood that the shield 25 completely covers the lower surface of the conductive insert 17, the non-conductive material 21 carried thereby, and each of the three portions 22, 23, 24, as was heretofore noted.

Figure 3:
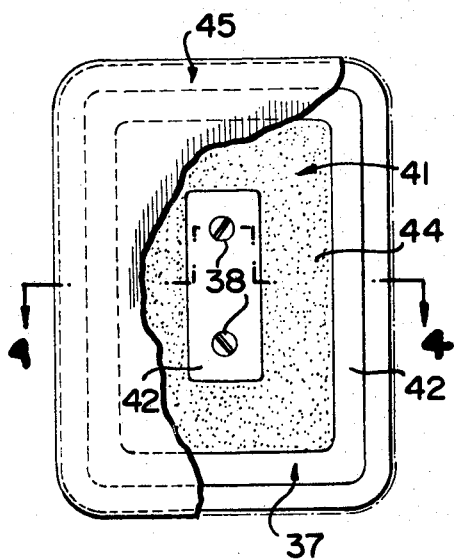
FIGURE 3 is a fragmentary plan view of another heating plate constructed in accordance with this invention, and illustrates a removable and replaceable insert secured to a base member of the heating plate.
Figure 4:
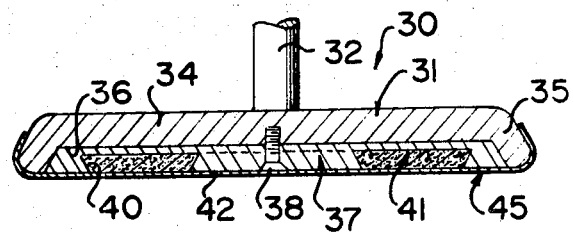
FIGURE 4 is a slightly enlarged sectional view taken generally along line 4—4 of FIGURE 3, and more clearly illustrates the particular configuration of the insert and non-heat conducting material carried thereby.

Another heating plate constructed in accordance with this invention is illustrated in FIGURES 3 and 4 of the drawing, and is substantially identical to the heating plate 10 of FIGURES 1 and 2. The heating plate 30 includes a base member 31 provided with an actuating rod or shaft 32. The base member 31 includes a wall 34 and a peripheral skirt or wall 35 defining a recess 36, corresponding to the recess 16 of the heating plate 10. An insert 37 constructed from conductive material is seated in the recess 36 and removably secured therein by means of conventional screws 38 in the manner readily apparent from FIGURES 3 and 4 of the drawing. The insert 37 includes a generally annular channel or recess 40 in which is housed non-heat conductive material 41, such as asbestos. The recess 40 is generally of an inverted U-shaped configuration in transverse section (FIGURE 4) with the legs (unnumbered) thereof converging toward one another and a lowermost surface 42 of the insert 37. The particular configuration of the recess 40 lends itself to being filled with a slurry of asbestos material which, when solidified, is prevented from being inadvertently or accidentally removed from the recess 40 due to the particular interlocking configuration thereof.

A cover or shield 45, corresponding to the cover or shield 25 of the heating plate 10, is secured in overlying relationship to the insert 37 and functions to produce a progressive temperature differential across the surface 42 of the insert 37 and a corresponding surface 44 of the non-heat conducting material 41.

From a comparison of FIGURES 1 and 3, it is readily apparent that the surface area of the heat conductive material 21 is less than that of the heat conductive area 41. Thus, the heating plate 30 is adapted for use with apparatus which includes larger molds or cavities and can produce correspondingly larger and/or deeper thermoformed articles. If, however, a smaller article is to be molded by heating a web of thermoplastic material by the heating plate 30, the cover 45 is removed, the fastening means 38 are removed, the insert 37 is removed from the recess 36 and another insert is inserted in the recess 36 and secured in place by the securing means 38. This other insert (not shown) may have more or less exposed non-heat conductive material 41, depending upon the particular size and depth of article which is to be formed. However, in accordance with this invention, the base member 31 and the recess 36 thereof is formed sufficiently large to accommodate the largest insert which is associated with the largest mold of the thermoforming apparatus (not shown). As progressively smaller articles are to be formed, inserts with progressively less exposed non-heat conductive material may be substituted in lieu of the inserts of maximum non-heat conductive material and vice versa.

In further accordance with this invention, it has been found unnecessary to actually contact the heating plates 10, 30 against a web during a thermoforming operation in the manner heretofore described. Rather, either of the heating plates 10, 30 is supported adjacent and in close proximity to the web material which is intermittently moved by conventional means toward a thermoforming apparatus. The heating plates develop a convective "heat pattern" corresponding to the plate configuration which heats the web in substantially the same manner as though the web were actually contacted by the plates. In this manner differential heating is effected in the absence of plate-to-web contact.

It has also been found that as mold size decreases and particularly as it reaches an essentially square configuration, the annular-shaped inserts 21, 41 of non-heat conducting material provide such a small central high-heat generating area that excessive web heating will take place. That is, as the annular shape of the insert 21, for example, becomes larger, the central portion 22 (FIGURE 1) becomes comparatively smaller until excessive heat generation occurs at the central portion. This high concentration of heat development has been overcome in smaller heating plates by employing two parallel non-heat conducting inserts transverse to the direction of web travel. While preferred forms and arrangement of parts have been shown in illustrating the invention, it is to be clearly understood that various changes in details and arrangement of parts may be made without departing from the spirit and scope of the invention as defined in the appended claimed subject matter.

We claim:
1. A differential heating plate particularly adapted for use in thermoforming thermoplastic material comprising a base member including means defining a working surface, said working surface including generally heat conductive and non-heat conductive surface areas, said non-heat conductive surface area being of a generally annular configuration substantially surrounding one of said heat conductive surface areas and being surrounded by another of said heat-conductive areas, means for heating said heat conductive surface areas whereby a temperature differential is effected between the heat and non-heat conductive surface areas, and a sheet of heat-conductive material overlying both said heat and non-heat conductive surface areas thereby producing a progressive temperature differential across said working surface.

2. The differential heating plate as defined in claim 1 wherein said non-heat conductive surface area is defined by non-heat conductive means housed within a recess defined in part by walls converging in a direction toward said heat-conductive sheet.

3. The differential heating plate as defined in claim 1 wherein said base member includes a recess within which is housed said working surface defining means, and means for releasably securing said working surface defining means within said recess whereby said last-mentioned means can be removed and replaced by similar means differing in the amount of heat conductive to non-heat conductive surface areas present.

4. The differential heating plate as defined in claim 2 where said base member includes a recess within which is housed said working surface defining means, and means for releasably securing said working surface defining means within said recess whereby said last-mentioned means can be removed and replaced by similar means differing in the amount of heat conductive to non-heat conductive surface areas present.

5. The differential heating plate as defined in claim 3 wherein said securing means are fastening means securing said heat-conductive sheet to said base member.

6. The differential heating plate as defined in claim 1 wherein said base member is defined in part by a peripheral skirt defining a recess opening in a direction toward said heat-conductive sheet, said working surface defining means being a portion of an insert received in said recess, said insert defining said heat-conductive surface areas, said insert further including generally annularly contoured recess means opening in a direction toward said heat-conductive sheet, and said non-heat conductive surface area having a portion of non-heat conductive material housed within said annularly contoured recess means.

7. The differential heating plate as defined in claim 6 wherein said annularly contoured recess means are defined in part by walls converging in a direction toward said heat-conductive sheet.

8. The differential heating plate as defined in claim 6 wherein said insert is releasably retained in said recess by releasable securing means securing said heat-conductive sheet to said base member.

9. The differential heating plate as defined in claim 6 including means for releasably securing said insert within said recess whereby said insert can be removed and replaced by annular inserts differing in the amount of heat conductive and non-heat conductive surface areas present.

10. The differential heating plate as defined in claim 7 including means for releasably securing said insert within said recess whereby said insert can be removed and replaced by annular inserts differing in the amount of heat conductive and non-heat conductive surface areas present.

References Cited
UNITED STATES PATENTS

| | | | |
|---|---|---|---|
| 2,390,550 | 12/1945 | Moore | 156—583 X |
| 2,582,581 | 1/1952 | Bona | 156—583 X |
| 2,743,761 | 1/1956 | Snyder et al. | 156—583 |
| 2,834,395 | 5/1958 | Russell et al. | 156—583 X |
| 2,904,100 | 9/1959 | Fener | 156—583 |
| 3,015,601 | 1/1962 | Fener | 156—583 |
| 3,102,182 | 8/1963 | Oelze et al. | 100—93 |
| 3,258,386 | 6/1966 | Blythe | 158—583 |

ROBERT A. O'LEARY, *Primary Examiner.*

A. W. DAVIS, *Assistant Examiner.*